United States Patent
Johnson et al.

(10) Patent No.: US 10,156,171 B2
(45) Date of Patent: Dec. 18, 2018

(54) MOUNTING AFTERTREATMENT SYSTEMS FROM SERVICE JOINTS

(71) Applicant: Cummins Emission Solutions Inc., Columbus, IN (US)

(72) Inventors: Ryan M. Johnson, Cottage Grove, WI (US); Randolph G. Zoran, McFarland, WI (US); George E. Mavroudis, Oregon, WI (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 552 days.

(21) Appl. No.: 14/820,949

(22) Filed: Aug. 7, 2015

(65) Prior Publication Data
US 2017/0037766 A1    Feb. 9, 2017

(51) Int. Cl.
| | | |
|---|---|---|
| *F01N 13/18* | (2010.01) | |
| *F01N 3/20* | (2006.01) | |
| *F01N 13/00* | (2010.01) | |

(52) U.S. Cl.
CPC ....... *F01N 3/2066* (2013.01); *F01N 13/0097* (2014.06); *F01N 13/1838* (2013.01); *F01N 13/1894* (2013.01); *Y02T 10/24* (2013.01)

(58) Field of Classification Search
CPC ........ B60K 13/04; F16L 12/047; F16L 12/06; F16L 12/028; F16L 12/0286
See application file for complete search history.

(56) References Cited

U.S. PATENT DOCUMENTS

| | | | | |
|---|---|---|---|---|
| 1,978,195 | A | * 10/1934 | Haas | ........ F16L 21/06 24/279 |
| 2,217,664 | A | * 10/1940 | Berger | ........ F01N 13/06 285/224 |
| 2,451,285 | A | * 10/1948 | Heath | ........ F01N 13/1816 138/122 |
| 3,913,955 | A | * 10/1975 | Teja | ........ F01N 13/1805 285/337 |
| 3,960,232 | A | 6/1976 | Hubbell, III | |
| 3,977,486 | A | 8/1976 | Kleinschmit | |
| 3,992,157 | A | 11/1976 | Stute | |
| 4,014,282 | A | 3/1977 | Kollman | |
| 4,033,170 | A | 7/1977 | Kawamura et al. | |

(Continued)

FOREIGN PATENT DOCUMENTS

DE    102006029242 A1 * 1/2007 ............ F16L 23/04

*Primary Examiner* — Katy M Ebner
(74) *Attorney, Agent, or Firm* — Foley & Lardner LLP

(57) ABSTRACT

An apparatus comprises a housing including a housing first portion having a first joint portion configured to overlap a second joint portion of a housing second portion so as to form a housing joint. A primary clamp is positioned at a primary location of the housing joint which abuts at least a portion of the first and the second joint portion. A mounting bracket is positioned on and contacts the primary clamp. A plurality of secondary clamps are positioned at secondary locations, each of which is different than the primary location, of the housing joint. A band is operatively coupled to the mounting bracket by positioning around and contacting each of the plurality of secondary clamps. The band is tightened to urge the mounting bracket and thereby the primary clamp, and the plurality of secondary clamps towards the housing joint to secure the housing joint.

19 Claims, 8 Drawing Sheets

(56) References Cited

U.S. PATENT DOCUMENTS

| | | | |
|---|---|---|---|
| 4,063,700 A * | 12/1977 | Brewer | F01N 13/1805 24/277 |
| 4,165,612 A | 8/1979 | Fujioka et al. | |
| 4,192,142 A | 3/1980 | Häegele | |
| 4,288,111 A * | 9/1981 | Feutz | F16L 23/04 285/183 |
| 4,309,019 A * | 1/1982 | Bloom | B60K 13/04 248/59 |
| 4,313,043 A | 1/1982 | White et al. | |
| 4,352,783 A | 10/1982 | Bailey | |
| 4,359,126 A | 11/1982 | Aiba | |
| 4,471,853 A | 9/1984 | Callaghan et al. | |
| 4,489,463 A * | 12/1984 | Schafer | F01N 13/1805 24/20 R |
| 4,570,322 A | 2/1986 | Dence | |
| 4,643,464 A * | 2/1987 | Weinhold | F16L 27/12 285/233 |
| 4,693,502 A * | 9/1987 | Oetiker | F16L 23/04 285/334.5 |
| 4,745,742 A | 5/1988 | Nada et al. | |
| 4,795,615 A | 1/1989 | Cyron et al. | |
| 4,807,436 A | 2/1989 | Deutschmann et al. | |
| 4,813,720 A * | 3/1989 | Cassel | F01N 13/1805 285/419 |
| 4,860,852 A | 8/1989 | Valev | |
| 5,116,581 A | 5/1992 | Cyron et al. | |
| 5,197,698 A | 3/1993 | Bartholomew | |
| 5,411,349 A * | 5/1995 | Hornung | B64G 1/641 285/407 |
| 5,522,454 A | 6/1996 | Gros et al. | |
| 5,560,528 A | 10/1996 | Chen | |
| 5,683,224 A | 11/1997 | Sebald et al. | |
| 5,762,381 A * | 6/1998 | Vogel | F16L 23/04 285/330 |
| 5,890,685 A * | 4/1999 | Takahashi | B60K 13/04 248/74.1 |
| 5,908,187 A * | 6/1999 | Kalkoske | F16L 55/035 248/60 |
| 5,988,148 A | 11/1999 | Astner et al. | |
| 6,095,460 A * | 8/2000 | Mercer | F01N 13/1822 180/309 |
| 6,167,861 B1 | 1/2001 | Kouchi et al. | |
| 6,227,183 B1 | 5/2001 | Miyoshi et al. | |
| 6,293,842 B1 | 9/2001 | Belt | |
| 6,305,054 B1 * | 10/2001 | Imes | F01N 13/1805 24/276 |
| 6,311,677 B1 | 11/2001 | Cook et al. | |
| 6,331,019 B1 * | 12/2001 | Friess | F01N 13/1811 285/300 |
| 6,340,322 B1 | 1/2002 | Yoshida et al. | |
| 6,508,329 B2 | 1/2003 | Maki et al. | |
| 6,508,491 B1 * | 1/2003 | Ebinger | F01N 13/1805 285/223 |
| 6,756,107 B1 | 6/2004 | Schierz et al. | |
| 6,789,532 B2 | 9/2004 | Kato et al. | |
| 6,896,568 B2 | 5/2005 | Matsuda | |
| 6,967,006 B1 | 11/2005 | Wirth et al. | |
| 7,185,490 B2 | 3/2007 | Smatloch et al. | |
| 7,485,033 B2 | 2/2009 | Baehr et al. | |
| 7,562,592 B2 | 7/2009 | Kono et al. | |
| 7,571,880 B2 | 8/2009 | Perez | |
| 7,610,748 B2 | 11/2009 | Kono et al. | |
| 7,617,957 B2 | 11/2009 | Holderfield et al. | |
| 7,704,459 B2 | 4/2010 | Merry et al. | |
| 7,713,492 B2 | 5/2010 | Maus et al. | |
| 7,854,981 B2 | 12/2010 | Schierz | |
| 7,870,725 B2 | 1/2011 | Hazelton | |
| 7,897,117 B2 | 3/2011 | Balk et al. | |
| 8,074,762 B2 | 12/2011 | Mabuchi et al. | |
| 8,141,535 B2 | 3/2012 | Olsen et al. | |
| 8,211,373 B2 | 7/2012 | Olson et al. | |
| 8,225,899 B2 | 7/2012 | Mabuchi et al. | |
| 8,261,537 B2 | 9/2012 | Osbat et al. | |
| 8,349,265 B2 | 1/2013 | Beauharnois | |
| 8,353,093 B2 | 1/2013 | Stewart et al. | |
| 8,561,395 B2 | 10/2013 | Golin et al. | |
| 8,610,023 B2 | 12/2013 | Nakajima | |
| 8,678,038 B2 | 3/2014 | Adachi | |
| 8,679,415 B2 | 3/2014 | Fernandes, Jr. | |
| 8,726,643 B2 | 5/2014 | Way et al. | |
| 8,726,875 B2 | 5/2014 | Culp et al. | |
| 8,752,866 B2 | 6/2014 | Inayama | |
| 8,776,510 B2 | 7/2014 | Stein et al. | |
| 8,776,872 B2 | 7/2014 | Capelle et al. | |
| 8,869,527 B2 | 10/2014 | Werstat et al. | |
| 8,926,911 B2 | 1/2015 | Kumar et al. | |
| 8,944,753 B2 | 2/2015 | Bouchard et al. | |
| 8,974,740 B2 * | 3/2015 | Stanavich | F01N 13/1805 422/170 |
| 2003/0015872 A1 * | 1/2003 | Potts | F16L 21/005 285/420 |
| 2004/0060763 A1 * | 4/2004 | Stodolka | B60K 13/04 180/309 |
| 2004/0075276 A1 * | 4/2004 | Lemke | F01N 13/1805 285/367 |
| 2004/0207201 A1 * | 10/2004 | Starita | F16L 9/06 285/363 |
| 2005/0264010 A1 * | 12/2005 | Wagner | F16L 23/04 285/363 |
| 2006/0175837 A1 * | 8/2006 | Ignaczak | F16L 21/065 285/420 |
| 2006/0202480 A1 * | 9/2006 | Cassel | F01N 13/1805 285/408 |
| 2006/0220384 A1 * | 10/2006 | Quackenbush | F16L 27/04 285/408 |
| 2006/0286013 A1 * | 12/2006 | Hovda | F01N 3/035 422/177 |
| 2009/0189392 A1 * | 7/2009 | Ignaczak | F16L 21/065 285/420 |
| 2011/0023452 A1 * | 2/2011 | Gisslen | F01N 13/1827 60/272 |
| 2013/0154252 A1 * | 6/2013 | Rakowicz | F16L 35/00 285/18 |
| 2013/0292938 A1 * | 11/2013 | Grivetti | F01N 13/16 285/298 |
| 2017/0276283 A1 * | 9/2017 | Kerns | F16L 55/168 |

\* cited by examiner

MOUNTING AFTERTREATMENT SYSTEMS FROM SERVICE JOINTS

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Aftertreatment systems generally include a plurality of components which are positioned within a housing of the aftertreatment system. Each of the plurality of components can include separate modules having their own housing which can be coupled together to assemble the aftertreatment component. The housings of each of the plurality of components are coupled together at service joints to assemble the aftertreatment system. The service joints represent mechanically weak areas which are secured via clamps. Mounting assemblies are used to mount such aftertreatment systems on a structure, for example a vehicle chassis. Such mounting assemblies are generally coupled to the aftertreatment system at locations which are different than the service joints. Thus, a substantial surface of the housing of the aftertreatment system is occupied by the clamps and the mounting members, reducing the space available for mounting other components on the surface of the housing of the aftertreatment system and increasing costs.

SUMMARY

Embodiments described herein relate generally to aftertreatment systems which include a clamping assembly for securing housing joints and mounting the aftertreatment system on a structure. In various embodiments, the aftertreatment systems described herein include a housing having a plurality of portions that are joined together at housing joints which are secured using a clamping assembly. The clamping assembly is also configured to mount the housing on a structure so that the aftertreatment system is mounted on the structure at the one or more housing joints.

In a first set of embodiments, an apparatus comprises a housing including a housing first portion and a housing second portion. The housing first portion includes a first joint portion configured to overlap a second joint portion of the housing section portion so as to form a housing joint. A primary clamp is positioned at a primary location of the housing joint. The primary clamp abuts at least a portion of the first joint portion and the second joint portion. A mounting bracket is positioned on and contacts the primary clamp. A plurality of secondary clamps are positioned at secondary locations of the housing joint. Each of the plurality of secondary locations is different than the primary location. The plurality of secondary clamps also abut at least a portion of the first joint portion and the second joint portion. A band is operatively coupled to the mounting bracket. The band is positioned around and contacts each of the plurality of secondary clamps. The band is configured to be tightened so as to urge the mounting bracket and thereby the primary clamp, and the plurality of secondary clamps towards the housing joint to secure the housing joint.

In another set of embodiments, an aftertreatment system comprises a housing including a housing first portion and a housing second portion. The housing first portion includes a first joint portion configured to overlap a second joint portion of the housing second portion so as to form a housing joint. A first aftertreatment component is positioned within a first internal volume defined by the housing first portion. A primary clamp is positioned at a primary location of the housing joint. The primary clamp abuts at least a portion of the first joint portion and the second joint portion. A mounting bracket is positioned on and contacts the primary clamp. A plurality of secondary clamps are positioned at secondary locations of the housing joint. Each of the plurality of secondary locations are different than the primary location. The plurality of secondary clamps abut at least a portion of the first joint portion and the second joint portion. A band is operatively coupled to the mounting bracket. The band is positioned around and contacts each of the plurality of secondary clamps. The band is configured to be tightened to urge the mounting bracket and thereby the primary clamp, and the plurality of secondary clamps towards the housing joint to secure the housing joint.

In yet another a set of embodiments, a method of securing a housing joint of a housing which comprises a housing first portion including a first joint portion configured to overlap a second joint portion of a housing second portion so as to form a housing joint, comprises positioning a primary clamp at a primary location of the housing joint. The primary clamp is positioned so that the primary clamp abuts at least a portion of the first joint portion and the second joint portion. A mounting bracket is positioned on the primary clamp such that the mounting bracket contacts the primary clamp. A band is operatively coupled to the mounting bracket. A plurality of secondary clamps are positioned at a plurality of secondary locations of the housing joint so that the plurality of secondary clamps abut at least a portion of the first joint portion and the second joint portion. Each of the plurality of secondary locations are different than the primary location. The band is positioned around each of the plurality of secondary clamps such that the band contacts each of the plurality of secondary clamps. The band is tightened so as to urge the mounting bracket and thereby the primary clamp, and the plurality of secondary clamps towards the housing joint to secure the housing joint.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
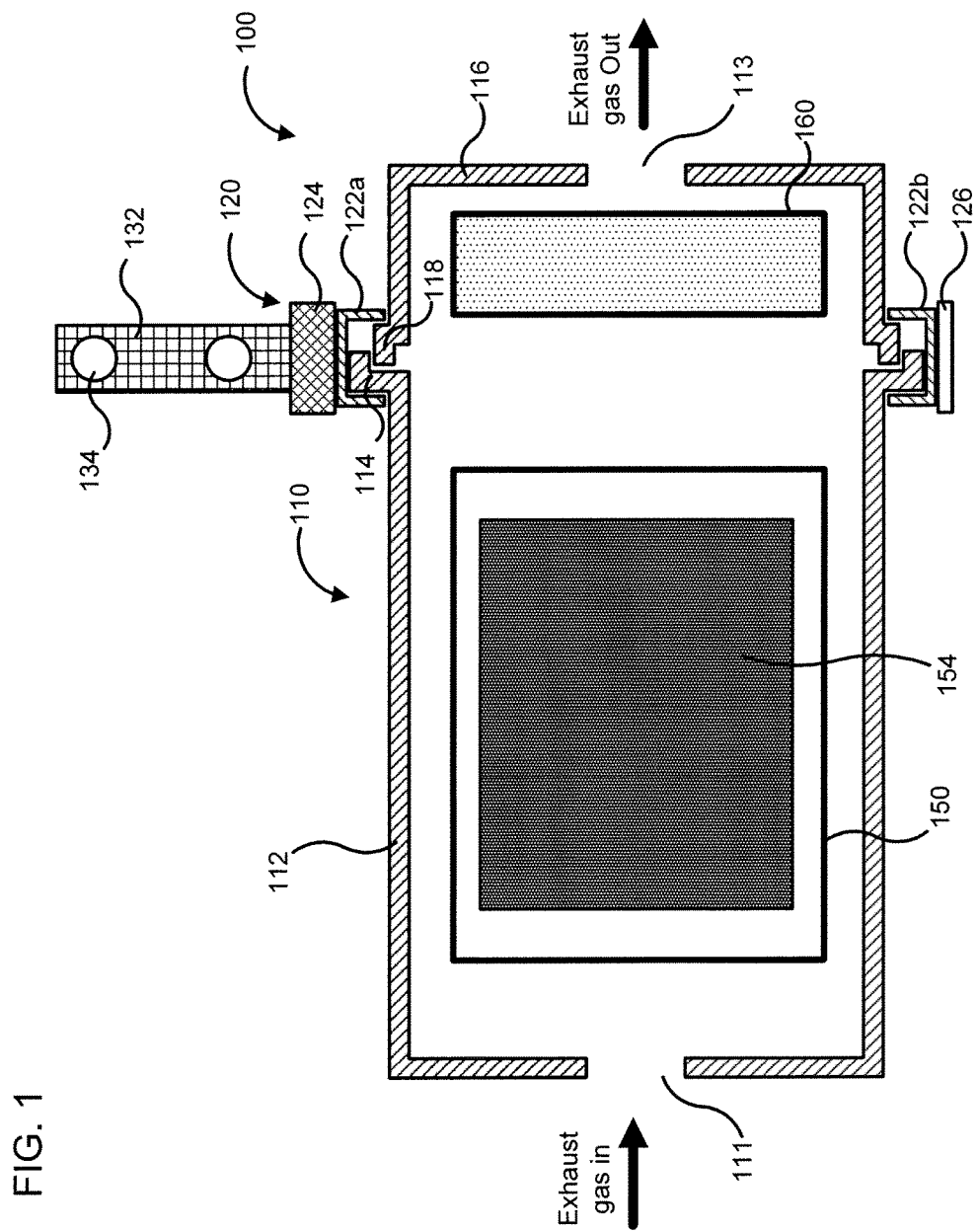
FIG. 1 is a schematic illustration of a side cross-section of an aftertreatment system that includes a first aftertreatment component and a second aftertreatment component having a housing including a housing first portion, a housing second portion, a clamping assembly and a mounting arm, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to aftertreatment systems which include a clamping assembly for securing housing joints and mounting the aftertreatment system on a structure. In various embodiments, the aftertreatment systems described herein include a housing having a plurality of portions that are joined together at housing joints which are secured using a clamping assembly. The clamping assembly is also configured to mount the housing on a structure so that the aftertreatment system is mounted on the structure at the one or more housing joints.

Embodiments described herein provide benefits including, for example: (1) providing a clamping assembly capable of securing housing joints of a housing as well as mounting the housing on a structure; (2) allowing mounting of a housing of an aftertreatment system to a structure at housing joints (also referred to herein as "service joints") which can be preferable mounting locations for mounting the housing of the aftertreatment system; (3) reducing the number of clamps for securing and mounting the aftertreatment system thereby increasing the space available on the housing of the aftertreatment system for installing other components; and (5) reducing a number of high strength mounting surfaces of the housing which are generally used as the locations for positioning clamps for mounting the aftertreatment system to a structure, thereby reducing manufacturing and assembly cost.

FIG. 1 is a schematic illustration of a side cross section of an aftertreatment system 100 according to an embodiment. The aftertreatment system 100 includes a housing 110, a clamping assembly 120, a mounting arm 132, a first aftertreatment component 150 and a second aftertreatment component 160. The aftertreatment system 100 is configured to receive an exhaust gas (e.g., a diesel exhaust gas) from an IC engine (e.g., a diesel IC engine) and decompose constituents (e.g., NOx gases) included in the exhaust gas.

The housing 110 includes a housing first portion 112 and a housing second portion 116. The housing first portion 112 is positioned upstream of the housing second portion 116. The housing first portion 112 includes an inlet 111 for receiving the exhaust gas. The housing first portion 112 defines a first internal volume. The first aftertreatment component 150 is positioned within the first internal volume.

In various embodiments, the first aftertreatment component 150 can include an SCR system 150. At least one catalyst 154 is included in the SCR system 150 and is formulated to selectively reduce constituents (e.g., NOx gases) included in the exhaust gas. Any suitable catalyst can be used such as, for example, platinum, palladium, rhodium, cerium, iron, manganese, copper, vanadium based catalyst, any other suitable catalyst, or a combination thereof. In other embodiments, the first aftertreatment component 150 can include any other component, for example an oxidation catalyst (e.g. a diesel oxidation catalyst), a particulate filter (e.g., a diesel particulate filter, a catalyzed filter or a partial filter) or a mixer.

The housing second portion 116 is positioned downstream of the housing first portion 112 and includes an outlet 113 for expelling treated exhaust gas into the environment. The housing second portion 116 defines a second internal volume within which the second aftertreatment component 160 is positioned. The second aftertreatment component 160 can include any suitable component, for example an SCR system, an oxidation catalyst (e.g. a diesel oxidation catalyst), a particulate filter (e.g., a diesel particulate filter, a catalyzed filter or a partial filter), a mixer or any other aftertreatment component.

The housing second portion 116 is coupled to the housing first portion 112 at a housing joint. Expanding further, the housing first portion 112 includes a first joint portion 114 which is configured to overlap a second joint portion 118 of the housing second portion 116 to form the housing joint. For example, a first cross-section (e.g., diameter) of the housing first portion 112 at the first joint portion 114 can be slightly larger than a second cross-section (e.g., diameter) of the housing second portion 116 at the second joint portion 118. This allows the first joint portion 114 to be positioned over and around the second joint portion 118 to couple the housing first portion 112 to the housing second portion 116. In particular embodiments, the first cross-section and the second cross-section can be within close tolerance of each other so that the first joint portion 114 and the second joint portion 118 form a friction fit.

The clamping assembly 120 is configured to be positioned around the housing joint to secure the housing joint and allow securing of the housing joint to a structure (e.g., a vehicle chassis), as described herein. The clamping assembly 120 includes a primary clamp 122a positioned at a primary location of the housing joint so that the primary clamp 122a abuts at least a portion of the first joint portion 114 and the second joint portion 118, as shown in FIG. 1. The primary location can be positioned, for example, proximate to the structure when the housing 110 (and thereby the aftertreatment system 100) is mounted to the structure.

The primary clamp 122a is formed from a strong from a strong, rigid and temperature resistant material, for example metals (e.g., stainless steel, aluminum, etc.), plastics, polymers or any other suitable material. The primary clamp 122a can include a V-shaped clamp. A mounting bracket 124 is positioned on and contacts the primary clamp 122a. For example, the mounting bracket 124 includes a side wall which is in continuous contact or contiguous with a surface of the primary clamp 122a. The mounting bracket 124 is configured to urge the primary clamp 122a towards the housing joint as described below herein.

A plurality of secondary clamps 122b are positioned at a plurality of secondary locations of the housing joint. Each of the plurality of secondary locations is different than the primary location. For example, the primary location is located proximate to the structure, and each of the secondary locations are located distal to the structure at various locations on the housing joint around the periphery of the housing 110. The plurality of secondary clamps 122b also abut at least a portion of the first joint portion 114 and the second joint portion 118.

Any number of secondary clamps can be used, for example 2, 3, 4, 5 or 6 clamps. In some embodiments, the plurality of secondary clamps 122b can be substantially similar to the primary clamp 122a. For example, the secondary clamps 122b may be V-shaped clamps, may be formed from the same material, may define the same curvature and may have the same length (e.g., arc length) as the primary clamp 122b. The distinguishing between the primary clamp 122a and the secondary clamps 122b is thus only by virtue of the location of the primary clamp 122a at the primary location. In such embodiments, the primary clamp 122a and each of the plurality of secondary clamps 122b are positioned along the same peripheral length of the housing joint as the primary clamp 122a.

In other embodiments, the secondary clamps 122b can be different from the primary clamp 122a, for example have a different length. For example, the secondary clamps 122b can be longer than the primary clamp 122a so that the plurality of secondary clamps 122b are positioned on a longer peripheral length of the housing joint relative to the primary clamp 122a. The primary clamp 122a and the plurality of the secondary clamps 122b have a total length so that a combination of the primary clamp 122a and the plurality of secondary clamps 122b surround substantially all of the perimeter (e.g., circumference) of the housing joint. As used herein, the term "substantially all of the perimeter" means greater than the 90% of the perimeter of the housing joint.

In some embodiments, the housing 110 is a circular housing defining a circular cross-section. In such embodiments, the primary clamp 122a and the plurality of secondary clamps 122b are curved to conform to a curvature defined by the cylindrical housing 110. Furthermore, the mounting bracket 124 can include a curved sidewall configured to be positioned on and contact the primary clamp 122a such that the curved sidewall is in continuous contact with the curved primary clamp 122a.

A band 126 is operatively coupled to the mounting bracket 124. The band 126 is positioned around and contacts each of the plurality of secondary clamps 122b. The band 126 is configured to be tightened so as to urge the mounting bracket 124, and thereby the primary clamp 122a, and the plurality of secondary clamps 122b towards the housing joint to secure the housing joint. The band 126 can be formed from any suitable material, for example metals, fabric or polymers.

In various embodiments, the band 126 includes a band first portion coupled to a mounting bracket first end, and a band second portion coupled to a mounting bracket second end which is opposite the mounting bracket first end. For example, the mounting bracket 124 can include a second sidewall which extends from the sidewall contacting the primary clamp and is orthogonal to the sidewall (e.g., oriented at an angle between 80 degrees and 100 degrees to the sidewall). Protrusions can be defined on second sidewall projecting orthogonally (e.g., at an angle between 80 degrees and 10 degrees) from the second sidewall at the mounting bracket first end over which an end of band first portion is looped and secured, and the mounting bracket second end over which an end of the band second portion is looped and secured.

In one embodiment, throughholes can be defined in the second sidewall in place of the protrusions through which fasteners are inserted over which the ends of the band first portion and the band second portion are looped and secured as described before. In still other embodiments, the ends of the band first portion and the band second portion can be secured to the sidewall contacting the primary clamp 122a. For example, slots, clips or any other securing mechanism can be provided on the sidewall proximate to the mounting bracket first end and the mounting bracket second end for securing the ends of the band first portion and the band second portion, respectively.

A winch or any other tightening mechanism is coupled to each of the band first portion and the band second portion at second ends of the band first portion and the band second portion distal from the mounting bracket 124. The winch or other the tightening mechanism is configured to urge the band first portion and the band second portion towards each other (i.e., tightens the band 126) to clamp the mounting bracket 124 and thereby the primary clamp 122a, and the plurality of secondary clamps 122b towards the housing joint.

The mounting arm 132 is coupled to the mounting bracket 124 and is configured to mount the housing 110 on a structure e.g., a vehicle chassis. As shown in FIG. 1, the mounting arm 132 has a plurality of mounting apertures 134. The mounting apertures 134 can be configured to receive fasteners (e.g., bolts, screws, rivets and/or pins) therethrough for coupling the mounting arm to the structure and thereby mounting the aftertreatment system 100 on the structure.

The mounting bracket 124 can be structured to be removably coupled to a mounting arm coupling portion of the mounting arm 132. For example, the mounting bracket 124 can include a mounting bracket first portion and a mounting bracket second portion. A sidewall of the mounting bracket first portion is positioned on and contacts the primary clamp 122a, for example is in continuous contact with the primary clamp 122a (e.g., curved primary clamp 122a) as described before. A second sidewall of the mounting bracket first portion extends orthogonally from the sidewall (e.g., at an angle between 80 degrees and 100 degrees), as described before. In other words, the mounting bracket first portion defines an L-shape.

The mounting bracket second portion is positioned parallel to the second sidewall of the mounting bracket first portion such that a space is defined therebetween. The space is configured to receive a mounting arm coupling portion of the mounting arm 132. The mounting bracket first portion and the mounting bracket second portion can be separate members which can each be coupled to the mounting arm coupling portion to secure the mounting arm 132.

A plurality of fasteners can be used to couple the mounting bracket first portion and the mounting bracket second portion such that the mounting arm coupling portion is secured therebetween. For example, the mounting bracket first portion, the mounting bracket second portion and the mounting arm coupling portion can define mating throughholes through which the plurality of fasteners are inserted to secure the mounting arm coupling portion between the mounting bracket first portion and the mounting bracket second portion. While described as including separate mounting bracket first portion and the mounting bracket second portion, in various embodiments, the mounting bracket can be monolithically formed.

FIGS. 2-7 show various views of another embodiment of an aftertreatment system 200 and a clamping assembly 220 included in the aftertreatment system 200. The aftertreatment system 200 includes a housing 210, the clamping assembly 220, and a mounting arm 232. The aftertreatment system 200 is configured to receive an exhaust gas (e.g., a diesel exhaust gas) produced by an engine (e.g., a diesel IC engine) and decompose constituents of the exhaust gas.

Figure 2:
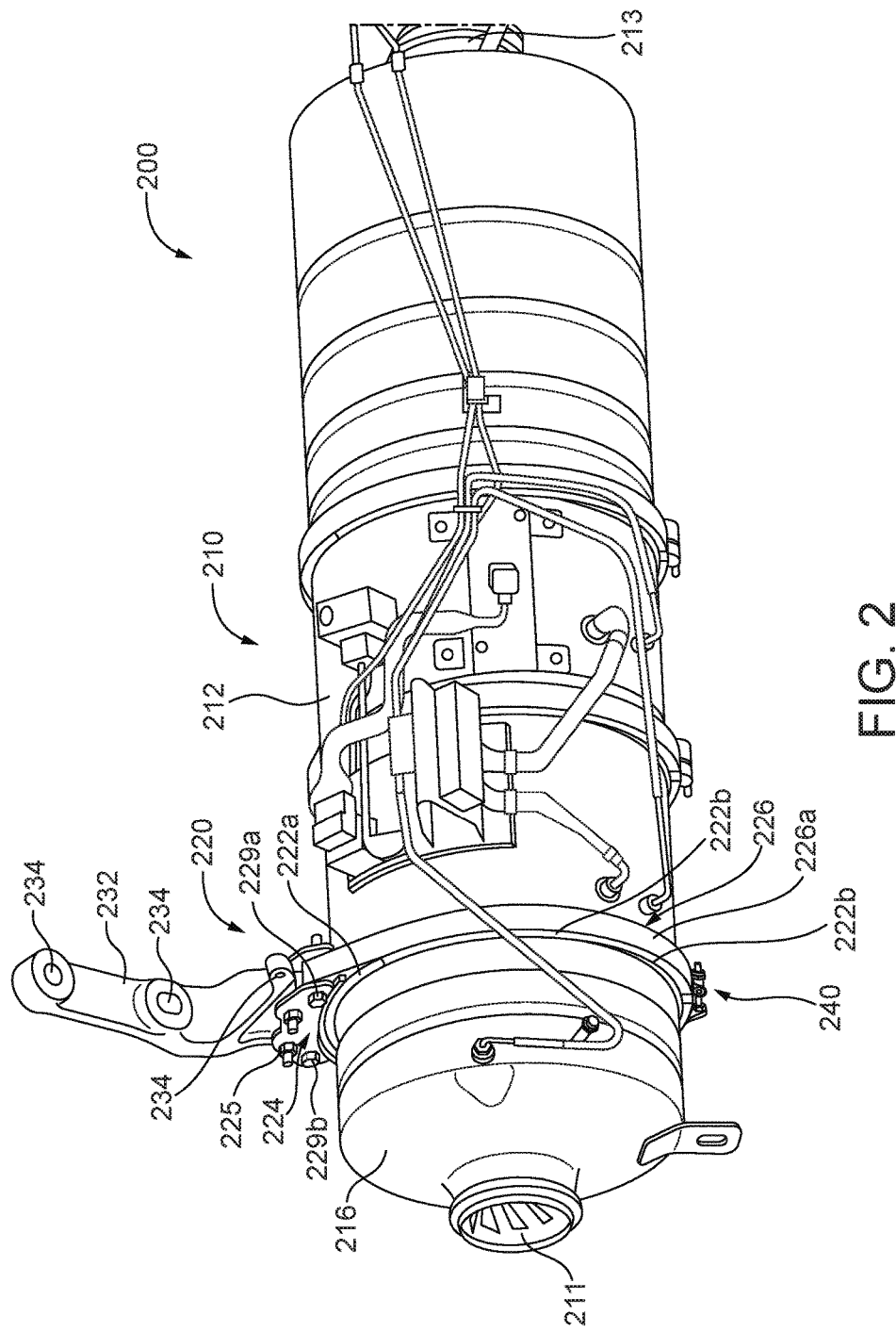
FIG. 2 is perspective view of another embodiment of an aftertreatment system that includes a housing including a housing first portion coupled to a housing second portion to form a housing joint. The housing joint is secured via a clamping assembly which is also used to mount the housing and thereby the aftertreatment system on a structure.

As shown in FIG. 2, the housing 210 is cylindrical and defines a circular cross-section. The housing 210 includes a housing first portion 212 and a housing second portion 216. The housing first portion 212 is positioned downstream of the housing second portion 216 and includes an outlet for expelling treated exhaust gas from the housing 110. The housing first portion can define a first internal volume. A first aftertreatment component (e.g., the first aftertreatment component 150) can be positioned within the first internal volume. The first aftertreatment component can include, for example an SCR system, an oxidation catalyst (e.g. a diesel oxidation catalyst), a particulate filter (e.g., a diesel particulate filter, a catalyzed filter or a partial filter) or a mixer.

The housing second portion 216 is positioned upstream of the housing first portion 212 and includes an inlet 211 for receiving the exhaust gas. The housing second portion 216 defines a second internal volume within which a second aftertreatment component (e.g., the second aftertreatment component 160) can be positioned. The second aftertreatment component can include any suitable component, for example an SCR system, an oxidation catalyst (e.g. a diesel oxidation catalyst), a particulate filter (e.g., a diesel particulate filter, a catalyzed filter or a partial filter) or a mixer or any other aftertreatment component.

Figure 4:
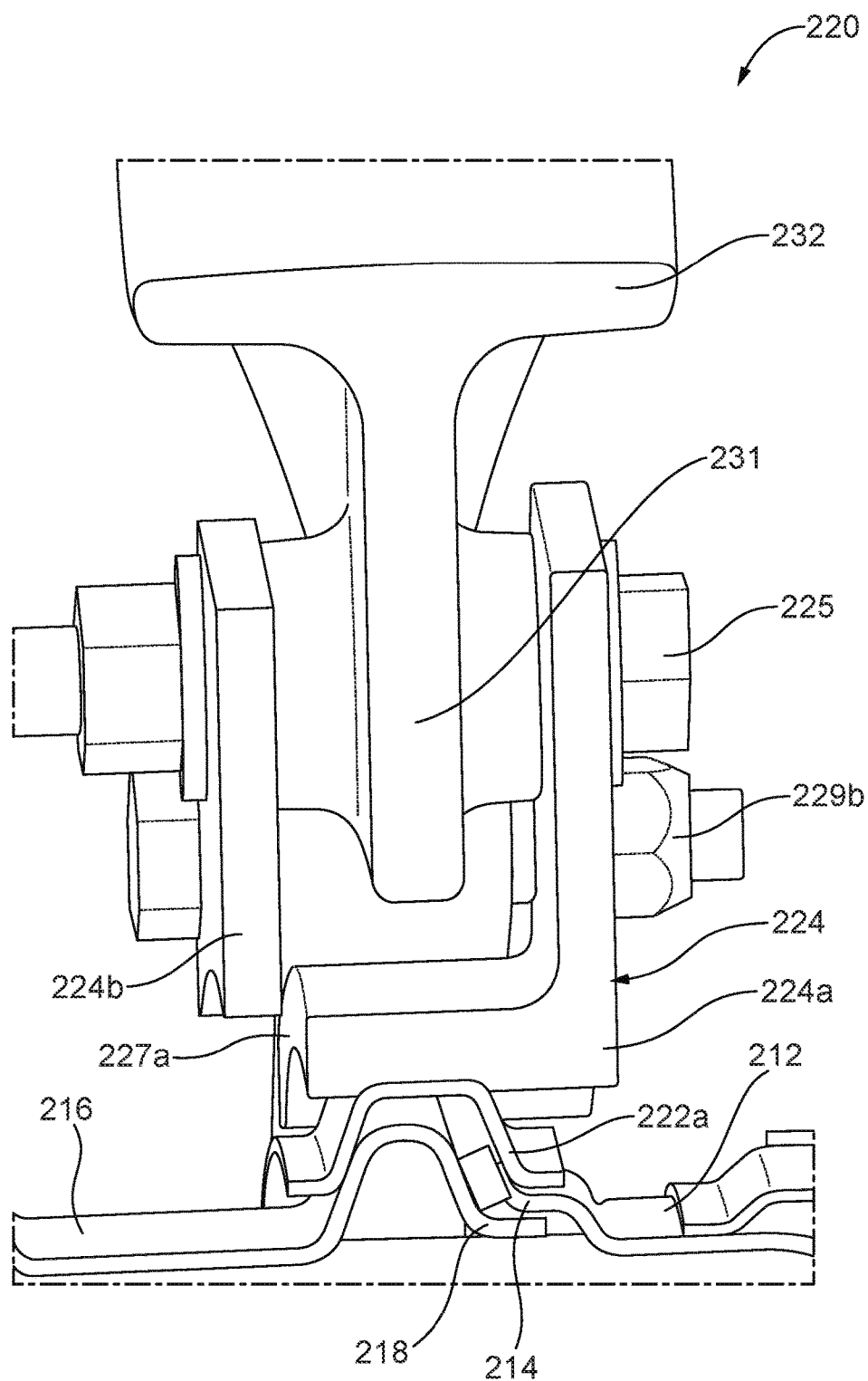
FIG. 4 is a side cross-section view of a primary location of the housing joint of FIG. 2 to show a portion of the clamping assembly and the overlapping first joint portion of the housing first portion and the second joint portion of the housing second portion clamped with a primary clamp positioned on the housing joint.

The housing second portion 216 is coupled to the housing first portion 212 at a housing joint. Expanding further, the housing first portion 212 includes a first joint portion 214 which is configured to overlap a second joint portion 218 of the housing second portion 216 to form the housing joint (see FIG. 4). As shown in FIG. 4, the second joint portion 218 includes a raised portion, while the first joint portion 214 also includes a raised portion configured to overlap the raised portion of the second joint portion 218. In particular embodiments, the first joint portion 214 has a first diameter slightly larger than a second diameter of the second joint portion 218. The first diameter and the second diameter can be in close tolerance with each other so that the first joint portion 214 and the second joint portion 218 form a friction fit.

The clamping assembly 220 is configured to be positioned around the housing joint to secure the housing joint and allow securing of the housing joint to a structure (e.g., a vehicle chassis), as described herein. The clamping assembly 220 includes a primary clamp 222a positioned at a primary location of the housing joint so that the primary clamp 222a abuts at least a portion of the first joint portion 214 and the second joint portion 218, as can be seen in FIG. 4. The primary location can be any location on the housing joint which is intended to be positioned proximate to the structure when the housing 210 (and thereby the aftertreatment system 200) is mounted to the structure.

The primary clamp 222a is formed from a strong, rigid material and temperature resistant material, for example metals (e.g., stainless steel, aluminum, etc.) or hard plastics. The primary clamp 222a includes a V-shaped clamp configured to overlap either side of the housing joint formed by the first joint portion 214 and the second joint portion 218. The primary clamp 222a is curved to conform to a curvature defined the cylindrical housing 210 and thereby the housing joint.

A mounting bracket 224 is positioned on and contacts the primary clamp 222a. The mounting bracket 224 includes a mounting bracket first portion 224a and a mounting bracket second portion 224b (see FIGS. 4 and 6). As shown in FIGS. 3-7, the mounting bracket first portion 224a includes a curved sidewall 227a positioned on and contacts the primary clamp 222a such that the curved sidewall 227a is in continuous contact with the curved primary clamp 222a. The mounting bracket 224 is configured to urge the primary clamp 222a towards the housing joint, as described below herein. In one embodiment, the primary clamp 222a can be coupled to the curved sidewall 227a of the mounting bracket 224, for example using fasteners (e.g., screws, bolts, rivets, etc.). A second sidewall of the mounting bracket first portion 224a extends orthogonally from the curved sidewall 227a (e.g., at an angle between 80 degrees and 100 degrees), as described before.

A plurality of secondary clamps 222b are positioned at a plurality of secondary locations of the housing joint. Each of the plurality of secondary locations is different than the primary location. For example, the primary location is located proximate to the structure, and each of the secondary locations are located distal to the structure (relative to the primary location) at various locations on the housing joint around the periphery of the housing 210. The plurality of secondary clamps 222b also abut at least a portion of the first joint portion 214 and the second joint portion 218.

Figure 5:
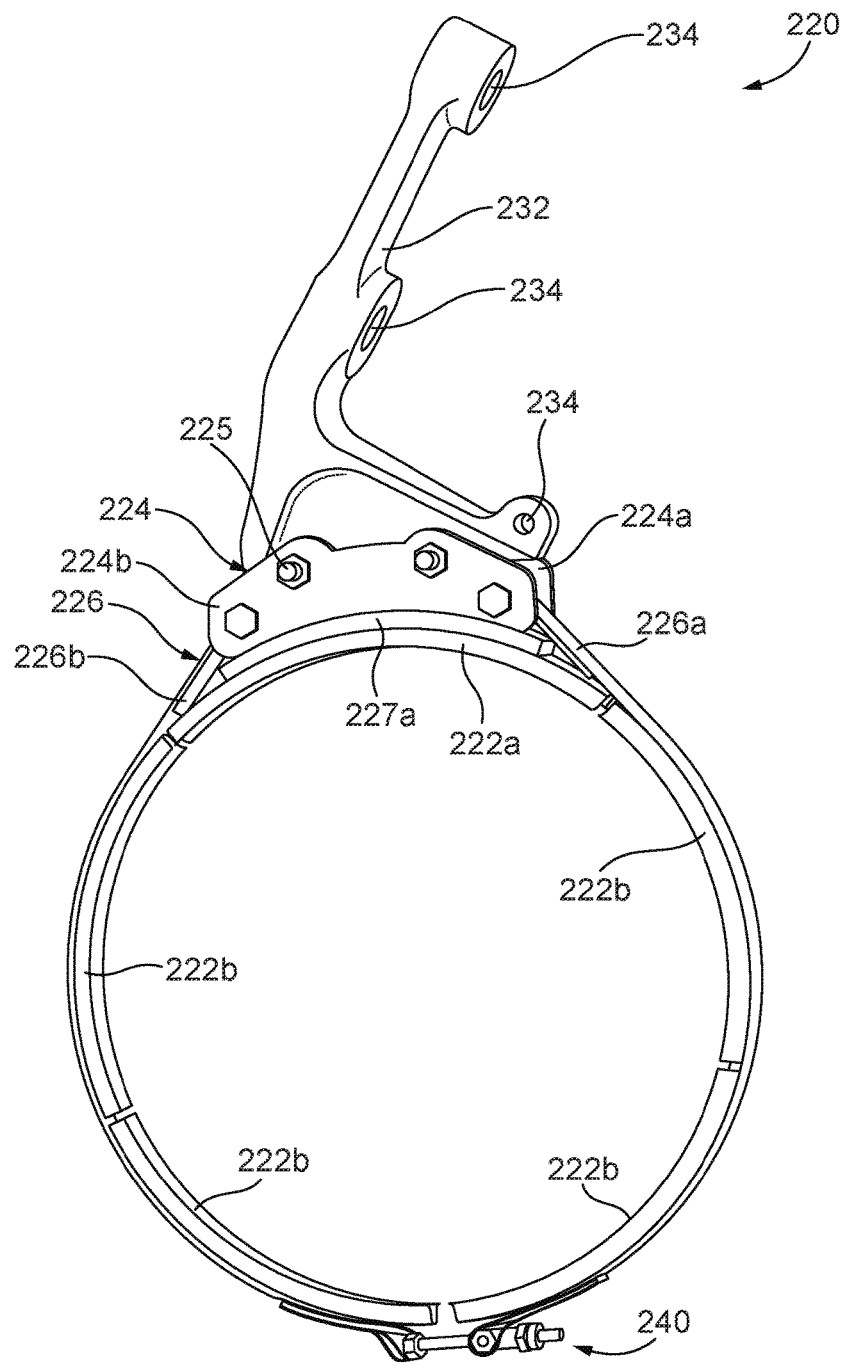
FIG. 5 is a front view of the clamping assembly included in the aftertreatment system of FIG. 2.

As seen in FIG. 5 the clamping assembly 220 includes four secondary clamps 222b positioned at various secondary locations around the housing joint. The plurality of secondary clamps 222b are substantially similar to the primary clamp 222a, for example, are V-shaped clamps, are formed from the same material, define the same curvature and have the same length (e.g., arc length) as the primary clamp 222a. The distinguishing between the primary clamp 222a and the secondary clamps 222b is thus only by virtue of the positioning of the primary clamp 222a at the primary location.

In other embodiments, any number of secondary clamps 222b can be used, for example 2, 3, 4, 5 or 6 clamps. In such embodiments, the secondary clamps 222b can be different from the primary clamp 222a, for example by having a different length. More specifically, the secondary clamps 222b can be longer than the primary clamp 222b so that the primary clamp 222b are positioned on a longer peripheral length of the housing joint relative to the primary clamp 222a. The primary clamp 222a and the plurality of the secondary clamps 222b have a total length so that a combination of the primary clamp 222a and the plurality of secondary clamps 222b surround substantially all of the perimeter (e.g., circumference) of the housing joint.

A band 226 is operatively coupled to the mounting bracket 224, as described herein. The band 226 is positioned around and contacts each of the plurality of secondary clamps 222b. The band 226 is configured to be tightened so as to urge the mounting bracket 224 and thereby the primary clamp 222a, and the plurality of secondary clamps 222b towards the housing joint to secure the housing joint. The band 226 can be formed from any suitable material, for example metals or polymers.

Figure 3:
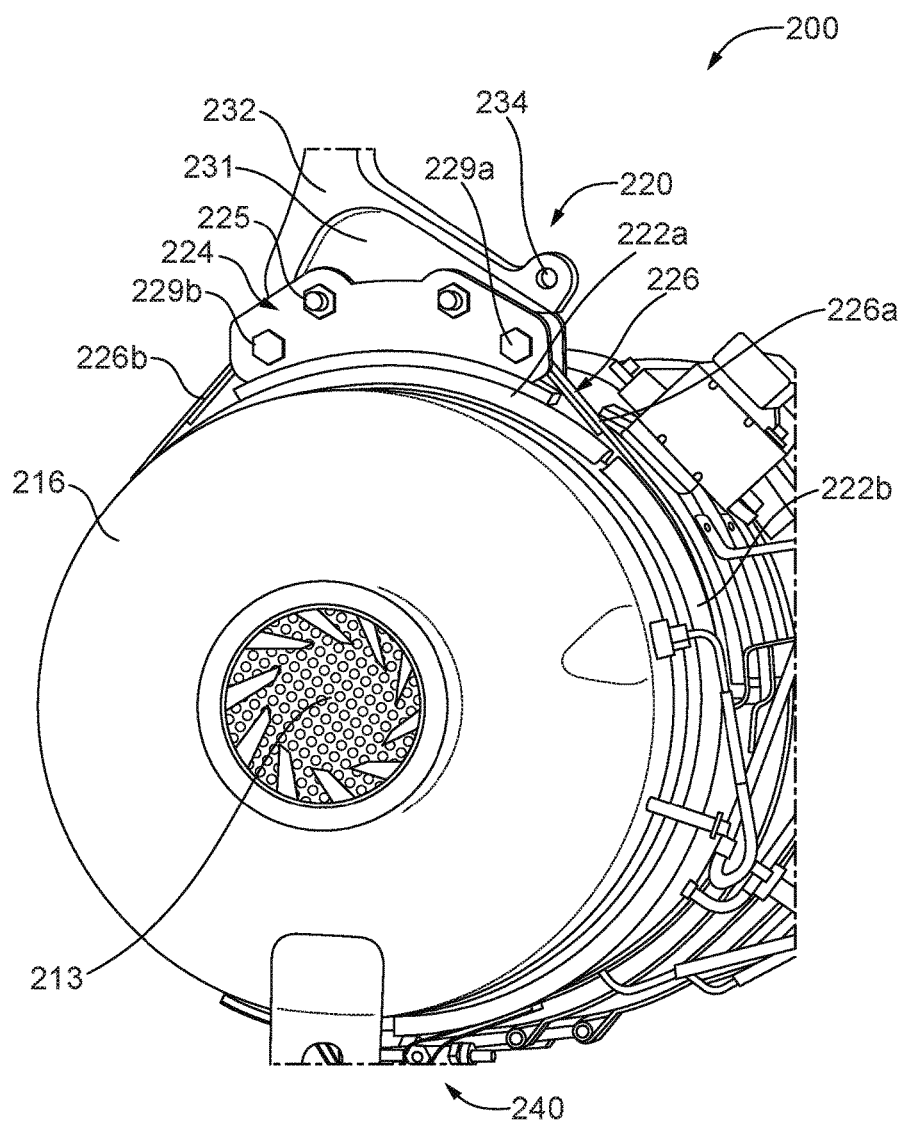
FIG. 3 is an end view of the aftertreatment system of FIG. 2.
Figure 7:
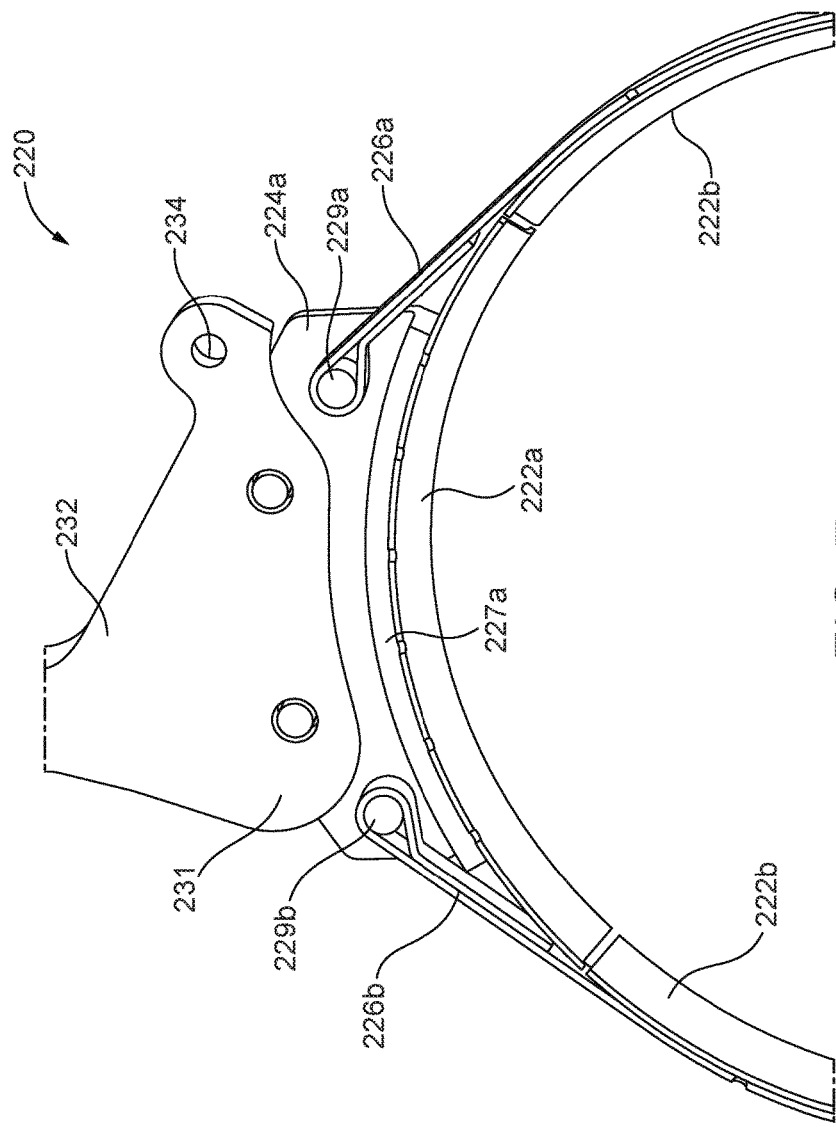
FIG. 7 is another cross-section view through a portion of the clamping assembly of FIG. 2 to show a band first portion and a band second portion.

As shown in FIGS. 3, 5 and 7, the band 226 includes a band first portion 226a coupled to a mounting bracket first end, and a band second portion 226b is coupled to a mounting bracket second end which is opposite the mounting bracket first end. The mounting bracket 224 includes a second sidewall which extends from the sidewall 227a contacting the primary clamp 222a and is orthogonal to the sidewall 227a (e.g., oriented at an angle between 80 degrees and 100 degrees to the sidewall).

Throughholes are defined in the second sidewall at the mounting bracket first end and the mounting bracket second end. A band first portion mounting fastener 229a and a band second portion mounting fastener 229b are inserted through the corresponding throughholes. A loop is defined on an end of the band first portion 226a which is slid over the band first portion mounting fastener 229a to secure the band first portion 226a to the mounting bracket first end, as shown in FIG. 7. Similarly, a loop is also defined on an end of the band second portion 226b which is slid over the band second portion mounting fastener 229b to secure the band second portion 226b to the mounting bracket second end. In other embodiments, the ends of the band first portion 226a and the band second portion 226b can be secured to the sidewall 227a contacting the primary clamp 222a. For example, slots, clips or any other securing mechanism can be provided on the mounting bracket first end and the mounting bracket second end on the sidewall 227a for securing the ends to the band first portion 226a and the band second portion 226b, respectively.

A winch 240 is coupled to a second end of each of the band first portion 226a and the band second portion 226b distal from the mounting bracket 224. The winch 240 can include, for example a lead screw type tightening winch, a ratchet winch, any other suitable winch or any other tightening mechanism. The winch 240 is configured to urge the band first portion 226a and the band second portion 226b towards each other (i.e., tighten the band 226) to clamp the mounting bracket 224 and thereby the primary clamp 222a, and the plurality of secondary clamps 222b towards the housing joint.

The mounting arm 232 is coupled to the mounting bracket 224 and is configured to mount the housing 210 on a structure e.g., a vehicle chassis. The mounting arm 232 includes a mounting arm coupling portion 231 and the mounting arm mounting portion 233 (see FIG. 6). The mounting arm mounting portion 233 and optionally, the mounting arm coupling portion 231 define a plurality of mounting apertures 234. The mounting apertures 234 can be configured to receive fasteners (e.g., bolts, screws, rivets and/or pins) therethrough for coupling or mounting the mounting arm 232, and thereby mounting the aftertreatment system 200 to the structure.

The mounting arm mounting portion 233 extends from the mounting arm coupling portion 231 at a non-zero angle relative to the mounting arm coupling portion 231. In various embodiments, the non-zero angle can be in the range of 30 degrees to 150 degrees and can be varied or adjusted based on a specific shape or geometry of the structure on which the aftertreatment system 200 is to be mounted.

Figure 6:
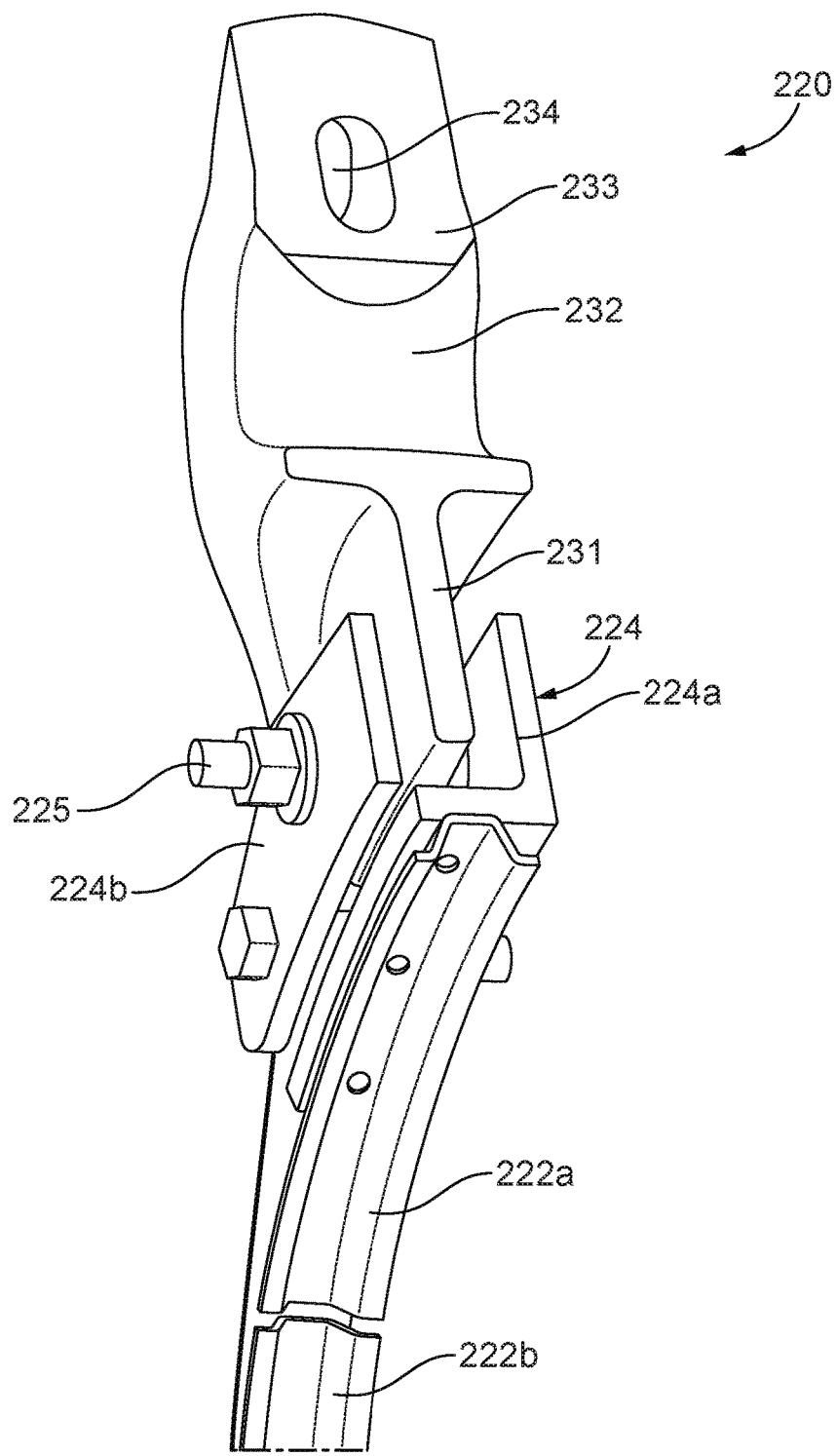
FIG. 6 is a cross-section view through a portion of the clamping assembly of FIG. 2 including the primary clamp, a mounting bracket and a mounting arm.

The mounting bracket second portion 224b is positioned parallel to the second sidewall of the mounting bracket first portion 224a such that a space is defined therebetween, as shown in FIG. 6. The space is configured to receive the mounting arm coupling portion 231 of the mounting arm 232. The mounting bracket first portion 224a and the mounting bracket second portion 224b are separate members which are coupled to the mounting arm coupling portion 231 on either side to secure the mounting arm 232.

A plurality of fasteners 225 are used to couple the mounting bracket first portion 224a and the mounting bracket second portion 224b such that the mounting arm coupling portion 231 is secured therebetween. Expanding further, the mounting bracket first portion 224a, the mounting bracket second portion 224b and the mounting arm coupling portion 231 define mating throughholes through which the plurality of fasteners 225 are inserted to secure the mounting arm coupling portion 231 between the mounting bracket first portion 224a and the mounting bracket second portion 224b.

Figure 8:
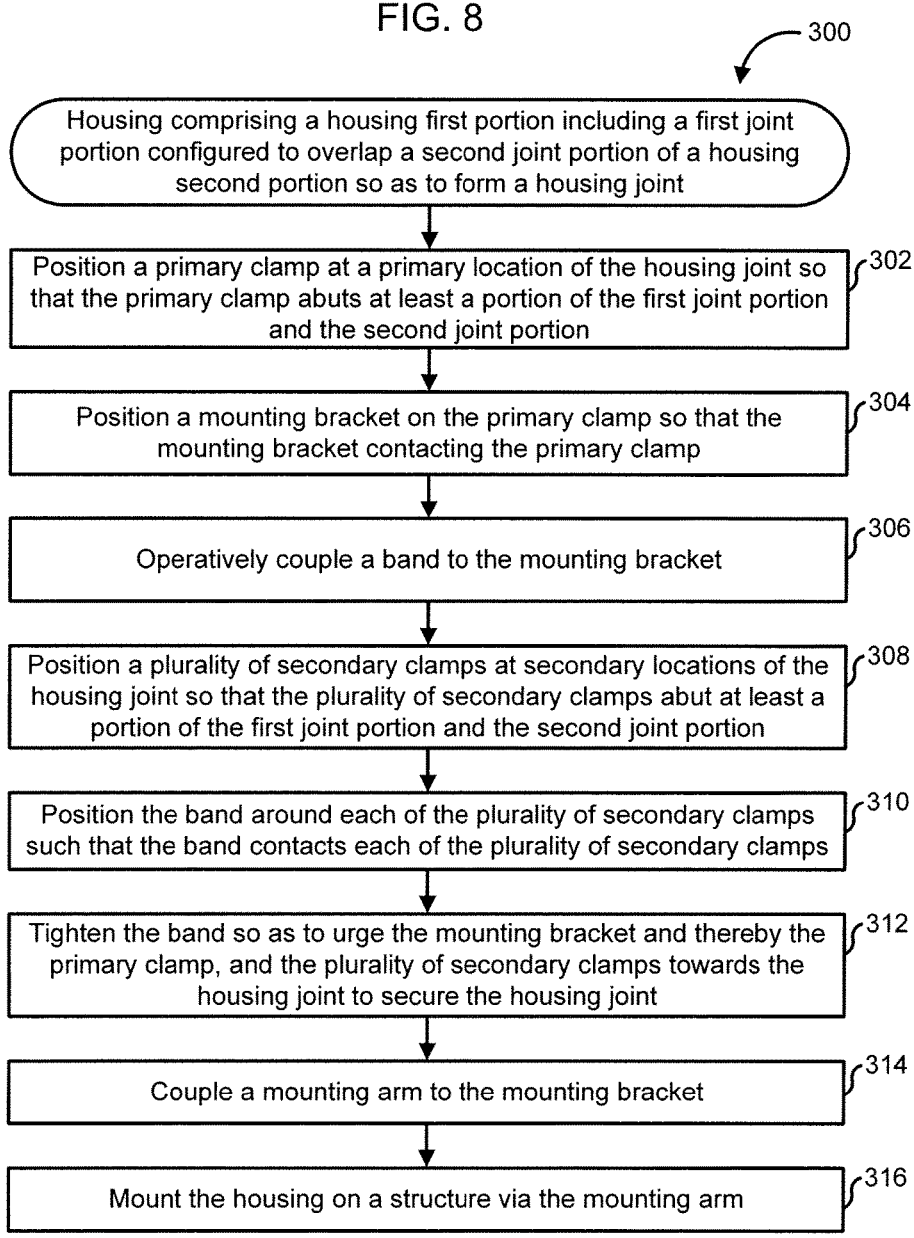
FIG. 8 is a schematic flow diagram of an example method for securing a housing joint of a housing using a clamping assembly and mounting the housing on a structure using the clamping assembly.

FIG. 8 is a schematic flow diagram of an example method 300 for securing a housing joint of a housing (e.g., the housing 110 or 210). The housing includes a housing first portion (e.g., the housing first portion 112, or 212) including a first joint portion configured to overlap a second joint portion of a housing second portion (e.g., the housing second portion 116 or 216) so as to form a housing joint.

The method 300 includes positioning a primary clamp at a primary location of the housing joint so that the primary clamps abuts at least a portion of the first joint portion and the second joint portion at 302. For example, the primary clamp 122a or 222a is positioned on the primary location of housing joint of the housing 110 or 210, as described above. In various embodiments, the primary location is configured to be positioned proximate to a structure (e.g., a vehicle chassis) on which the housing (e.g., the housing 110 or 210) may be mounted.

A mounting bracket is positioned on the primary clamp so that the mounting bracket contacts the primary clamp at 304. For example, the mounting bracket (e.g., 124 or 224) includes a sidewall (e.g., the curved sidewall 227a of the mounting bracket 224) configured to continuously contact the primary clamp, as described before.

A band is operatively coupled to the mounting bracket at 306. For example, the band (e.g., the band 226) can include a band first portion (e.g., the band first portion 226a) and a band second portion (e.g., the band second portion 226b). The band first portion is coupled to a mounting bracket first end and the band second portion is coupled to a mounting bracket second end opposite the first end. For example, loops can be defined on an end of the band first portion and the band second portion which can be looped around fasteners inserted through throughholes defined in the mounting bracket, as described above.

A plurality of secondary clamps are positioned at a plurality of secondary locations of the housing joint so that the plurality of secondary clamps abut at least a portion of the first joint portion and the second joint portion at 308. Each of the plurality of secondary locations are different than the primary location. For example, the secondary clamps 122*b* or 222*b* are positioned at various secondary locations around the housing joint. The secondary clamps can be similar in size and shape to the primary clamp or different, as described before. Furthermore, any number of secondary clamps can be used, for example 2, 3, 4, 5 or 6 as described before.

The band is positioned around each of the plurality of secondary clamps such that the band contacts each of the plurality of secondary clamps at 310. For example, the band first portion 226*a* is positioned around a first portion of the plurality of secondary clamps 222*b*, and the band second portion 226*b* is positioned around a second portion of the plurality of secondary clamps 222*b* such that the band first portion 226*a* and the band second portion 226*b* in combination are positioned around each of the plurality of secondary clamps 222*b*.

The band is tightened so as to urge the mounting bracket and thereby the primary clamp 222*a*, and the plurality of secondary clamps 222*b* towards the housing joint to secure the housing joint at 312. For example, the winch 240 or any other tightening mechanism is coupled to each of the band first portion 226*a* and the band second portion 226*b*. The winch 240 can be coupled to a second end of each of the band first portion 226*a* and the band second portion 226*b* distal from the mounting bracket. The band 226 is tightened by operating the winch to urge the band first portion 226*a* and the band second portion 226*b* towards each other to clamp the mounting bracket 224 and thereby the primary clamp 222*a*, the plurality of secondary clamps 222*b* towards the housing joint.

A mounting arm is coupled to the mounting bracket at 314. For example, the mounting arm 132 or 232 is coupled to the mounting bracket 124 or 224 or described before. In specific embodiments, the mounting bracket (e.g., the mounting bracket 224) includes a mounting arm coupling portion (e.g., the mounting arm coupling portion 231) at least a portion of which is positioned in a space between a mounting bracket first portion (e.g., the mounting bracket first portion 224*a*) and a mounting bracket second portion (e.g., the mounting bracket second portion 224*b*). A plurality of fasteners (e.g., the plurality of fasteners 225) can be passed through mating throughholes defined in the mounting bracket first portion, the mounting arm coupling portion and the mounting arm second portion such that the mounting arm coupling portion is secured between the mounting arm first portion and the mounting arm second portion.

The housing is mounted on a structure via the mounting arm at 316. For example, the mounting arm (e.g., the mounting arm 132 or 232) can define a plurality of mounting apertures (e.g., the mounting apertures 134 or 234). Fasteners can be inserted through the plurality of apertures to mount or install the housing on a structure (e.g., a vehicle chassis).

It should be noted that the term "example" is used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various example embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus, comprising:
    a housing including a housing first portion and a housing second portion, the housing first portion including a first joint portion configured to overlap a second joint portion of the housing section portion so as to form a housing joint;
    a primary clamp positioned at a primary location of the housing joint, the primary clamp abutting at least a portion of the first joint portion and the second joint portion;
    a mounting bracket positioned on and contacting the primary clamp;
    a plurality of secondary clamps positioned at secondary locations of the housing joint, each of the plurality of secondary locations being different than the primary location, the plurality of secondary clamps abutting at least a portion of the first joint portion and the second joint portion;
    a band operatively coupled to the mounting bracket, the band positioned around and contacting each of the plurality of secondary clamps, the band comprising a band first portion and a band second portion, the first and second band portions being formed as separate pieces; and
    a winch;

wherein the band is configured to be tightened so as to urge the mounting bracket and thereby the primary clamp, and the plurality of secondary clamps towards the housing joint to secure the housing joint;

wherein the band first portion is coupled to a mounting bracket first end;

wherein the band second portion is coupled to a mounting bracket second end opposite the mounting bracket first end; and wherein the winch is coupled to each of the band first portion and the band second portion and configured to urge the band first portion and the band second portion towards each other to clamp the mounting bracket and thereby the primary clamp, and the plurality of secondary clamps towards the housing joint.

2. The apparatus of claim 1, wherein the housing is a cylindrical housing defining a circular cross-section.

3. The apparatus of claim 2, wherein the primary clamp and the plurality of secondary clamps are curved to conform to a curvature defined by the cylindrical housing.

4. The apparatus of claim 3, wherein the mounting bracket includes a curved sidewall, the curved sidewall configured to be positioned on and contact the primary clamp such that the curved sidewall is in continuous contact with the curved primary clamp.

5. The apparatus of claim 1, further comprising a mounting arm coupled to the mounting bracket, the mounting arm configured to mount the housing on a structure.

6. The apparatus of claim 5, wherein the primary location is configured to be positioned proximate to the structure when the housing is mounted on the structure.

7. The apparatus of claim 5, wherein the mounting bracket includes a mounting bracket first portion and a mounting bracket second portion, a first sidewall of the mounting bracket first portion positioned on and contacting the primary clamp, the mounting bracket second portion positioned parallel to a second sidewall of the mounting bracket first portion extending orthogonally from the first sidewall such that a space is defined therebetween, the space configured to receive a mounting arm coupling portion of the mounting arm.

8. The apparatus of claim 7, further comprising a plurality of fasteners coupling the mounting bracket first portion and the mounting bracket second portion such that mounting arm coupling portion is secured therebetween, the plurality of fasteners passing through mating throughholes defined in the mounting bracket first portion, the mounting arm coupling portion and the mounting bracket second portion.

9. An aftertreatment system, comprising:
a housing including a housing first portion and a housing second portion, the housing first portion including a first joint portion configured to overlap a second joint portion of the housing second portion so as to form a housing joint;
a first aftertreatment component positioned within a first internal volume defined by the housing first portion;
a primary clamp positioned at a primary location of the housing joint, the primary clamp abutting at least a portion of the first joint portion and the second joint portion;
a mounting bracket positioned on and contacting the primary clamp;
a plurality of secondary clamps positioned at secondary locations of the housing joint, each of the plurality of secondary locations different than the primary location, the plurality of secondary clamps abutting at least a portion of the first joint portion and the second joint portion;
a band operatively coupled to the mounting bracket, the band positioned around and contacting each of the plurality of secondary clamps, the band comprising a band first portion and a band second portion, the first and second band portions being formed as separate pieces; and
a winch;
wherein the band is configured to be tightened to urge the mounting bracket and thereby the primary clamp, and the plurality of secondary clamps towards the housing joint to secure the housing joint;
wherein the band first portion is coupled to a mounting bracket first end;
wherein the band second portion coupled to a mounting bracket second end opposite the mounting bracket first end; and
wherein the winch is coupled to each of the band first portion and the band second portion and configured to urge the band first portion and the band second portion towards each other to clamp the mounting bracket and thereby the primary clamp, and the plurality of secondary clamps towards the housing joint.

10. The aftertreatment system of claim 9, wherein a second aftertreatment component is positioned within a second internal volume defined by the housing second portion.

11. The aftertreatment system of claim 10, wherein at least one of the first aftertreatment component and the second aftertreatment component includes a selective catalytic reduction system.

12. The aftertreatment system of claim 9, wherein the housing is a cylindrical housing defining a circular cross-section, and wherein the primary clamp and the plurality of secondary clamps are curved to conform to a curvature defined by the cylindrical housing.

13. The aftertreatment system of claim 12, wherein the mounting bracket includes a curved sidewall, the curved sidewall configured to be positioned on and contact the primary clamp such that curved sidewall is in continuous contact with the curved primary clamp.

14. The aftertreatment system of claim 9, wherein a mounting arm is coupled to the mounting bracket, the mounting arm configured to mount the aftertreatment system on a structure.

15. The aftertreatment system of claim 14, wherein the primary location is positioned proximate to the structure when the aftertreatment system is mounted on the structure.

16. The aftertreatment system of claim 14, wherein the mounting bracket includes a mounting bracket first portion and a mounting bracket second portion, a first sidewall of the mounting bracket first portion positioned on and contacting the primary clamp, the mounting bracket second portion positioned parallel to a second sidewall of the mounting bracket first portion extending orthogonally from the first sidewall such that a space is defined therebetween, the space configured to receive a mounting arm coupling portion of the mounting arm.

17. The apparatus of claim 16, further comprising a plurality of fasteners coupling the mounting bracket first portion and the mounting bracket second portion such that mounting arm coupling portion is secured therebetween, the plurality of fasteners passing through mating throughholes defined in the mounting bracket first portion, the mounting arm coupling portion and the mounting bracket second portion.

18. An apparatus, comprising:
    a housing including a housing first portion and a housing second portion, the housing first portion including a first joint portion configured to overlap a second joint portion of the housing section portion so as to form a housing joint;
    a primary clamp positioned at a primary location of the housing joint, the primary clamp abutting at least a portion of the first joint portion and the second joint portion;
    a mounting bracket positioned on and contacting the primary clamp;
    a plurality of secondary clamps positioned at secondary locations of the housing joint, each of the plurality of secondary locations being different than the primary location, the plurality of secondary clamps abutting at least a portion of the first joint portion and the second joint portion;
    a mounting arm coupled to the mounting bracket, the mounting arm configured to mount the housing on a structure;
    a band operatively coupled to the mounting bracket, the band positioned around and contacting each of the plurality of secondary clamps; and
    a plurality of fasteners;
    wherein the band is configured to be tightened so as to urge the mounting bracket and thereby the primary clamp, and the plurality of secondary clamps towards the housing joint to secure the housing joint;
    wherein the mounting bracket includes a mounting bracket first portion and a mounting bracket second portion, a first sidewall of the mounting bracket first portion positioned on and contacting the primary clamp, the mounting bracket second portion positioned parallel to a second sidewall of the mounting bracket first portion extending orthogonally from the first sidewall such that a space is defined therebetween, the space configured to receive a mounting arm coupling portion of the mounting arm; and
    wherein the plurality of fasteners couple the mounting bracket first portion and the mounting bracket second portion such that mounting arm coupling portion is secured therebetween, the plurality of fasteners passing through mating throughholes defined in the mounting bracket first portion, the mounting arm coupling portion and the mounting bracket second portion.

19. An aftertreatment system, comprising:
    a housing including a housing first portion and a housing second portion, the housing first portion including a first joint portion configured to overlap a second joint portion of the housing second portion so as to form a housing joint;
    a first aftertreatment component positioned within a first internal volume defined by the housing first portion;
    a primary clamp positioned at a primary location of the housing joint, the primary clamp abutting at least a portion of the first joint portion and the second joint portion;
    a mounting bracket positioned on and contacting the primary clamp;
    a plurality of secondary clamps positioned at secondary locations of the housing joint, each of the plurality of secondary locations different than the primary location, the plurality of secondary clamps abutting at least a portion of the first joint portion and the second joint portion;
    a band operatively coupled to the mounting bracket, the band positioned around and contacting each of the plurality of secondary clamps; and
    a plurality of fasteners;
    wherein the band is configured to be tightened to urge the mounting bracket and thereby the primary clamp, and the plurality of secondary clamps towards the housing joint to secure the housing joint;
    wherein a mounting arm is coupled to the mounting bracket, the mounting arm configured to mount the aftertreatment system on a structure;
    wherein the mounting bracket includes a mounting bracket first portion and a mounting bracket second portion, a first sidewall of the mounting bracket first portion positioned on and contacting the primary clamp, the mounting bracket second portion positioned parallel to a second sidewall of the mounting bracket first portion extending orthogonally from the first sidewall such that a space is defined therebetween, the space configured to receive a mounting arm coupling portion of the mounting arm; and
    wherein the plurality of fasteners couple the mounting bracket first portion and the mounting bracket second portion such that mounting arm coupling portion is secured therebetween, the plurality of fasteners passing through mating throughholes defined in the mounting bracket first portion, the mounting arm coupling portion and the mounting bracket second portion.

* * * * *